(12) United States Patent
Dianda et al.

(10) Patent No.: US 7,729,246 B1
(45) Date of Patent: Jun. 1, 2010

(54) SYSTEM AND METHOD FOR SUPPORTING INTER-NETWORK DISPATCH CALLS

(75) Inventors: Janet Ruth Dianda, Ashburn, VA (US); Peter Langlois, Leesburg, VA (US)

(73) Assignee: Nextel Communications Inc., Reston, VA (US)

( * ) Notice: Subject to any disclaimer, the term of this patent is extended or adjusted under 35 U.S.C. 154(b) by 679 days.

(21) Appl. No.: 11/649,827

(22) Filed: Jan. 5, 2007

(51) Int. Cl.
  *G01R 31/08* (2006.01)
  *H04L 5/16* (2006.01)
  *H04J 3/16* (2006.01)

(52) U.S. Cl. ...................... 370/230; 370/466
(58) Field of Classification Search ............. None
  See application file for complete search history.

(56) References Cited

U.S. PATENT DOCUMENTS

| | | | |
|---|---|---|---|
| 5,612,955 A * | 3/1997 | Fernandes et al. ........... 370/433 |
| 5,960,362 A | 9/1999 | Grob et al. | |
| 6,895,254 B2 * | 5/2005 | Dorenbosch ................ 455/518 |
| 2002/0102999 A1 * | 8/2002 | Maggenti et al. ............ 455/518 |
| 2002/0172169 A1 * | 11/2002 | Rosen et al. ................ 370/335 |
| 2006/0034336 A1 * | 2/2006 | Huh et al. ................... 370/498 |
| 2006/0281482 A1 * | 12/2006 | Yoshida et al. ............. 455/518 |

* cited by examiner

*Primary Examiner*—Seema S Rao
*Assistant Examiner*—Christine Duong

(57) ABSTRACT

Systems and methods for communications between networks that support dispatch communication services are provided. A server is coupled to at least two networks that provide dispatch communications, one of which employs an inactivity timer. When the server determines that the inactivity timer for a dispatch call is about to expire due to, for example, no bearer packets being transmitted, the server will request the floor of the call. The server will then transmit bearer packets for a predetermined amount of time, and then release the floor.

11 Claims, 2 Drawing Sheets

SYSTEM AND METHOD FOR SUPPORTING INTER-NETWORK DISPATCH CALLS

BACKGROUND OF THE INVENTION

Figure 1:
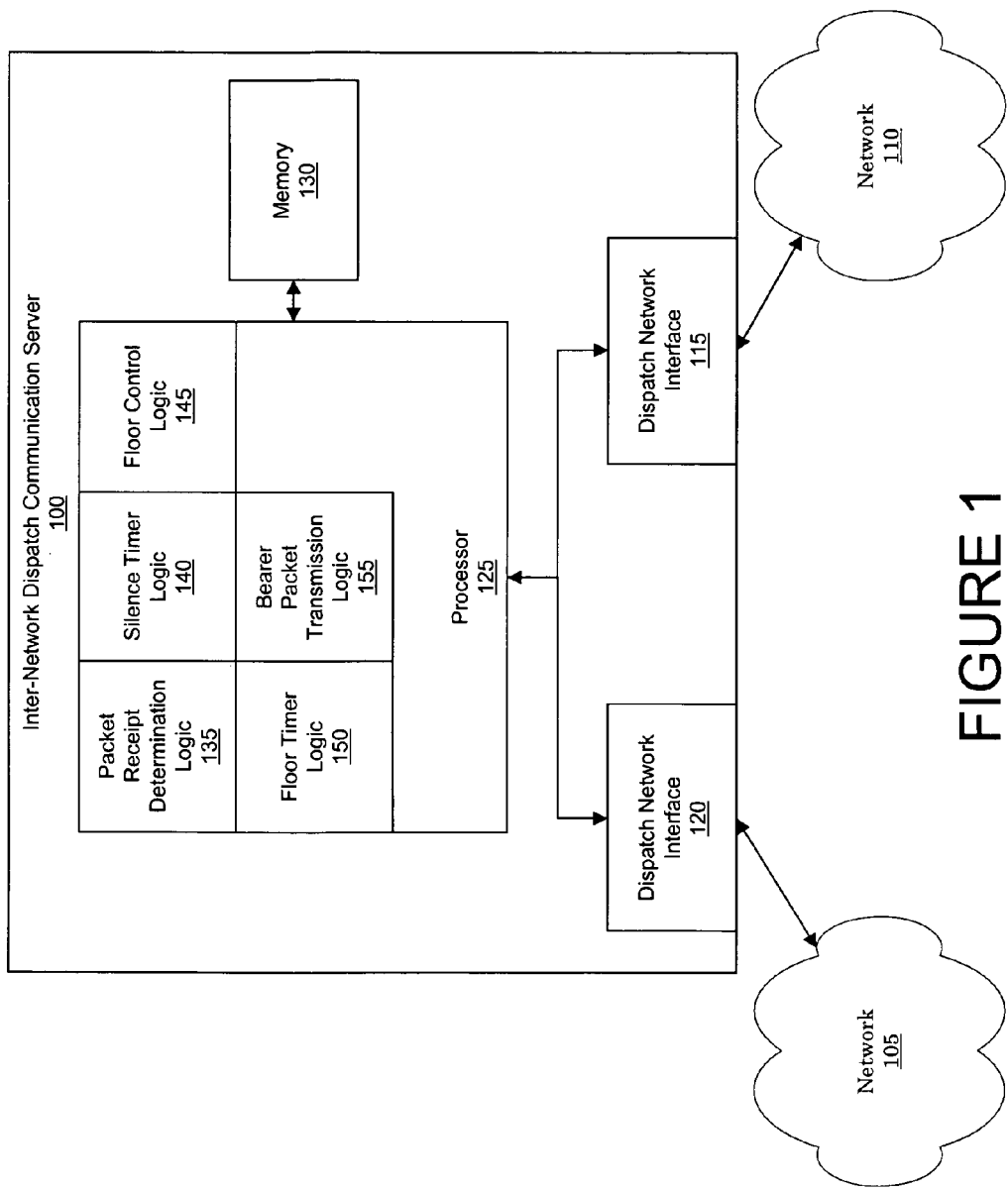

Wireless communication systems can provide a number of different voice communication services, including interconnect voice communication services and dispatch voice communication services. Interconnect voice communication services are those that are provided by most wireless communication systems, and are commonly considered as full-duplex, circuit-switched communications. Dispatch communication services are provided in only some wireless communication systems, and are commonly referred to as push-to-talk or walkie-talkie calls due to the half-duplex nature of the calls.

Dispatch communication services have typically been provided only in private wireless networks. For many years wireless networks based on the iDEN standard were the only publicly-accessible wireless networks that provided both dispatch and interconnect communication services. Recently wireless networks based on other wireless communication standards have incorporated dispatch communication services in addition to interconnect communication services. These newer dispatch communication services are based on, for example, Open Mobile Alliance (OMA) Push-to-Talk over Cellular (PoC) standards-based protocols or a proprietary protocol (e.g., Qualcomm's QChat™).

SUMMARY OF THE INVENTION

One problem with dispatch communication services are that dispatch calls typically could not be made between communication stations that are supported by networks that employ different protocols for providing dispatch communication services. Connecting such calls should account for differences in the operation of the different protocols.

It is recognized that one difference that should be accounted for is the hang timer used in some networks, such as iDEN networks. The hang timer is designed to conserve radio resources by tearing down a dispatch call when no bearer packets (i.e., voice packets) are transmitted for a predetermined period of time (e.g., 6 seconds). While iDEN networks employ a hang timer, many other networks that provide dispatch communication services do not employ such a timer. This can be problematic for both dispatch private calls (i.e., one-to-one calls) and dispatch groups calls (one-to-many) between different networks. For example, when some communication stations are located in a network that does not employ a hang timer while at least one communication station is supported in a network that does employ such a timer, if there are no bearer packets for the duration of the hang timer then the communication station supported by the network that does employ the hang timer will be dropped from the call while the remaining communication stations will continue to maintain the call.

Accordingly, exemplary embodiments of the present invention provide systems and methods for supporting inter-network dispatch calls. In accordance with the present invention a server, coupled to two networks that provide dispatch communication services, determines whether no bearer packets have been received for a period of time. When no bearer packets have been received, then the server can request the floor of the dispatch call and transmit bearer packets for a period of time, after which the server releases the floor.

Other objects, advantages and novel features of the present invention will become apparent from the following detailed description of the invention when considered in conjunction with the accompanying drawings.

BRIEF DESCRIPTION OF THE DRAWING FIGURES

Figure 2:
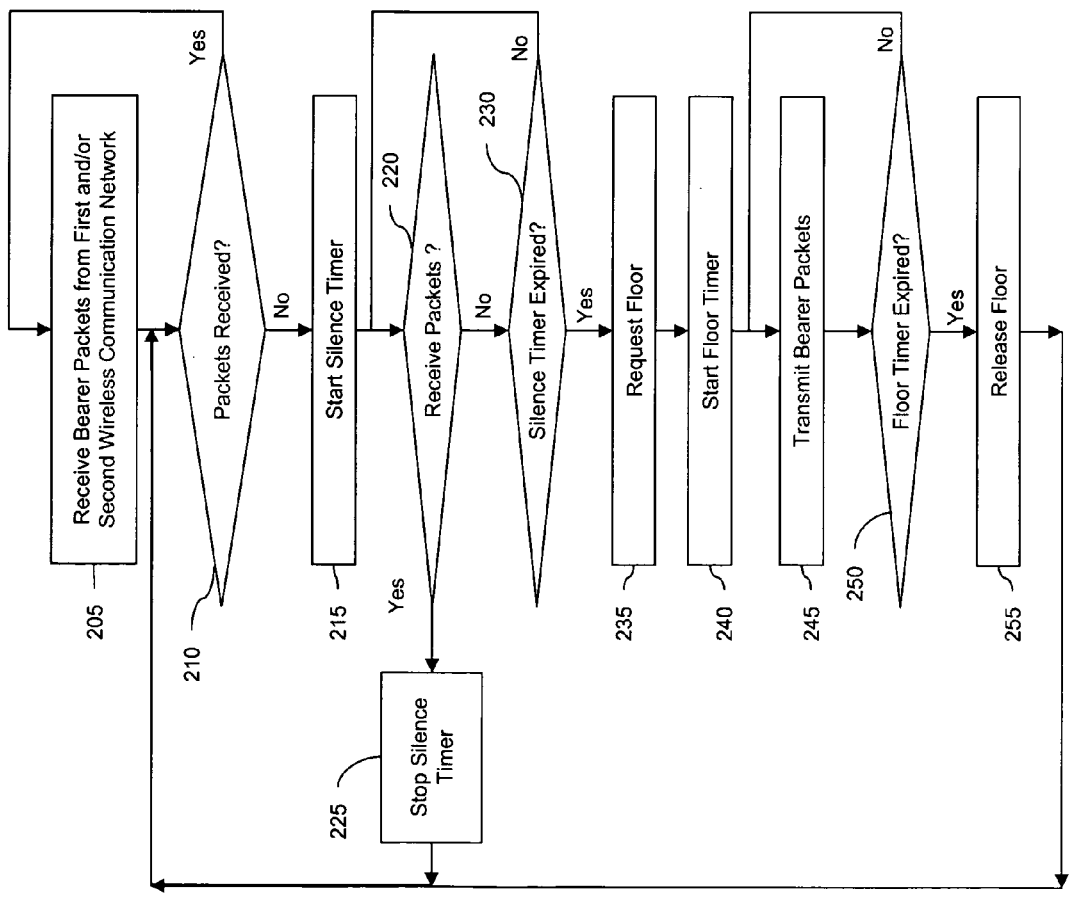

FIG. 1 is a block diagram of an exemplary inter-network dispatch communication server in accordance with the present invention; and FIG. 2 is a flow diagram of an exemplary method in accordance with the present invention.

DETAILED DESCRIPTION OF THE PREFERRED EMBODIMENTS

FIG. 1 is a block diagram of an exemplary inter-network dispatch communication server in accordance with the present invention. The system includes an inter-network dispatch communication server which is coupled between a first network 105 and a second network 110. Networks 105 and 110 operate according to different dispatch communication protocols, at least one of which employs a hang timer. In addition to providing dispatch communication services, these networks can also provide interconnect communication services. Although FIG. 1 illustrates server 100 coupled to only two communication networks, it can be coupled to more than two networks. Network 105 is coupled to inter-network dispatch communication server 100 via interface 120, and network 110 is coupled to inter-network dispatch communication server 100 via interface 115.

Inter-network dispatch communication server 100 includes processor 125 coupled to network interfaces 105 and 110, as well as memory 130. Processor 125 includes logic 135-155, which will be described in more detail below in connection with FIG. 2. Processor 125 can be a microprocessor, field programmable gate array (FPGA), application specific integrated circuit (ASIC) and/or the like. When processor 125 is a microprocessor, logic 135-155 can be processor executable code loaded from memory 130.

Server 100 can be a stand-alone network element that provides only the silence and floor timer functionality described below, or can be incorporated into an inter-network gateway that translates bearer and signaling packets, as necessary. In the latter case, the inter-network dispatch communication server 100 can include logic 135-155 in the processor of the gateway, and share, as necessary, the dispatch network interfaces and memory. In either case, for dispatch calls between networks 105 and 110, all bearer and signaling packets for communication stations in the different networks pass through the server. Inter-network dispatch communication server 100 can also be implemented to only handle signaling packets, and a media gateway can be employed to handle bearer packets. In this case, inter-network dispatch communication server 100 exchanges messages with the media gateway to, among other things, implement the method described below.

FIG. 2 is a flow diagram of an exemplary method in accordance with the present invention. Initially, server 100 receives bearer packets from network 105 or 110 (step 205). Logic 135 then determines whether bearer packets have been received (step 210). When logic 135 determines that no bearer packets are being received ("No" path out of decision step 210), then logic 140 starts a silence timer (step 215). The duration of the silence timer is set to a value that is less than that of a hang timer employed by one of networks 105 or 110. For example, if network 105 employs a hang timer with a duration of 6 seconds, then the duration of the silence timer can be, for example, 5.5 seconds. Logic 135 then determines whether packets have been received (step 220). When packets are received ("Yes" path out of decision step 220), then logic 140 stops and resets the silence timer (step 225).

When no packets are received ("No" path out of decision step 220), then logic 140 determines whether the silence timer has expired (step 230). When logic 140 determines that the silence timer has expired ("Yes" path out of decision step 230), then logic 145 requests the floor of the dispatch call from one or both of the networks (step 235). Whether the floor request is sent to one or both of the networks depends upon how floor control is implemented for inter-network dispatch calls. When floor control is distributed between the networks, then the floor request may be sent to both networks, and when floor control is assigned to one of the networks, then the floor request may be sent to that network.

Once the floor is granted, logic 150 starts a floor timer (step 240) and logic 155 transmits bearer packets to one or both of the networks (step 245). In order to minimize the load on the networks, the bearer packets can contain "comfort noise", which consumes little bandwidth. If desired, the bearer packets can be transmitted only to the network that implements a hang timer. The time period for the floor timer is a trade-off of occupying the floor for too long of a period of time versus having to continually request the floor to avoid expiration of the hang timer. This time duration can be, for example, 2 seconds.

Logic 150 then determines whether the floor timer has expired (step 250). Until the floor timer expires ("No" path out of decision step 250), logic 155 continues to send bearer packets. When the floor timer expires ("Yes" path out of decision step 250), logic 145 releases the floor (step 255), and then logic 135 determines whether packets are received (step 210).

Although exemplary embodiments of the present invention have been described in connection with a hang timer, it should be recognized that the present invention is equally applicable to any type of inactivity timer that has a call time-out value.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for a server supporting an inter-network dispatch call, the method comprising the acts of:
    receiving bearer packets from a second communications network;
    starting a first timer when bearer packets are not received;
    starting a second timer when the first timer has expired; and
    transmitting bearer packets to a first communication network for a duration of the second timer,
    wherein a duration of the first timer is less than a time-out value of a call in the first communication network,
    wherein the inter-network dispatch call is between a communication station in the first communication network and a communication station in the second communication network,
    wherein the second communication network does not employ a call time-out value.

2. The method of claim 1, further comprising the acts of:
    transmitting a floor request prior to transmitting the bearer packets.

3. The method of claim 1, wherein the transmitted bearer packets contain noise.

4. The method of claim 1, further comprising the acts of:
    determining that the second timer is expired; and
    transmitting a floor release message to the first communication network.

5. The method of claim 1, wherein the first communication network is an iDEN network.

6. A server, comprising:
    a first interface coupled to a first dispatch communication network;
    a second interface coupled to a second dispatch communication network, the server receiving bearer packets from the second dispatch communication network via the second interface; and
    a processor coupled to the first and second interfaces, the processor comprising
    logic that determines whether a bearer packet is received;
    silence timer logic that starts a first timer when bearer packets are not received;
    floor timer logic that starts a second timer when the first timer has expired; and
    bearer packet transmission logic that transmits bearer packets to the first communication network for a duration of the second timer,
    wherein a duration of the first timer is less than a time-out value of a call in the first communication network,
    wherein the second communication network does not employ a call time-out value.

7. The server of claim 6, wherein the processor further comprises:
    floor control logic that transmits a floor request prior to transmitting the bearer packets.

8. The server of claim 6, wherein the inter-network dispatch call is between a communication station in the first communication network and a communication station in the second communication network.

9. The server of claim 6, wherein the transmitted bearer packets contain noise.

10. The server of claim 6, wherein the floor timer logic determines that the second timer is expired, and the processor further comprises:
    floor control logic that transmits a floor release message to the first communication network.

11. The server of claim 6, wherein the first communication network is an iDEN network.

* * * * *